(12) United States Patent
Fukumoto et al.

(10) Patent No.: US 7,965,607 B2
(45) Date of Patent: Jun. 21, 2011

(54) HOLOGRAM RECORDING/REPRODUCING DEVICE AND RECORDING/REPRODUCING OPTICAL APPARATUS

(75) Inventors: Atsushi Fukumoto, Kanagawa (JP); Mikio Sugiki, Kanagawa (JP); Kenji Tanaka, Tokyo (JP); Naoto Kojima, Kanagawa (JP); Mitsuru Toishi, Tokyo (JP)

(73) Assignee: Sony Corporation (JP)

( * ) Notice: Subject to any disclaimer, the term of this patent is extended or adjusted under 35 U.S.C. 154(b) by 710 days.

(21) Appl. No.: 11/520,481

(22) Filed: Sep. 13, 2006

(65) Prior Publication Data

US 2007/0153663 A1 Jul. 5, 2007

(30) Foreign Application Priority Data

Sep. 16, 2005 (JP) ................ P2005-270240

(51) Int. Cl.
*G11B 7/0065* (2006.01)
*G11B 7/00* (2006.01)
(52) U.S. Cl. .................. 369/103; 369/112.02
(58) Field of Classification Search ............. 369/112.02, 369/103
See application file for complete search history.

(56) References Cited

U.S. PATENT DOCUMENTS

| 4,224,480 | A | * | 9/1980 | Satoh et al. ............. 369/47.48 |
| 5,719,691 | A | * | 2/1998 | Curtis et al. ................ 359/11 |
| 5,943,145 | A | * | 8/1999 | Curtis et al. ............... 369/103 |
| 6,108,110 | A |   | 8/2000 | Orlov et al. |
| 2002/0085250 | A1 | * | 7/2002 | Kim et al. ................. 359/22 |
| 2005/0141388 | A1 | * | 6/2005 | Yamatsu ................... 369/103 |
| 2005/0185234 | A1 | * | 8/2005 | Kim .......................... 359/35 |
| 2005/0226120 | A1 | * | 10/2005 | Nishiwaki et al. ......... 369/103 |
| 2006/0013104 | A1 | * | 1/2006 | Kihara et al. .............. 369/103 |

FOREIGN PATENT DOCUMENTS

| JP | 2001-194626 A | 7/2001 |
| JP | 2005-234579 A | 9/2005 |
| JP | 2005-241674 A | 9/2005 |

OTHER PUBLICATIONS

Holographic Media Coming Soon, Achievement of 200G Bits in 2006, Nikkei Electronics, pp. 106-114, Jan. 17, 2005.

* cited by examiner

*Primary Examiner* — Craig A. Renner
*Assistant Examiner* — Aneeta Yodichkas
(74) *Attorney, Agent, or Firm* — Lerner, David, Littenberg, Krumholz & Mentlik, LLP

(57) ABSTRACT

A hologram recording/reproducing device includes a recording/reproducing optical unit performing recording and reproducing operations on a hologram recording/reproducing medium. The optical unit includes a laser light source emitting laser light; a spatial-light modulator generating signal light and reference light from the laser light, the signal light and reference light having a common light path; a phase mask disposed near the modulator or in a conjugate plane of the modulator and transmitting at least the reference light; and an objective lens including a first lens portion and a second lens portion. The first lens portion is disposed at an inner peripheral portion of the objective lens and serves as a Fourier transformation lens focusing the signal light to a predetermined point. The second lens portion is disposed at an outer peripheral portion of the objective lens and has focuses continuously or discretely disposed in an optical-axis direction of the objective lens and at portions in the medium near the predetermined point.

5 Claims, 9 Drawing Sheets ness is provided, a reference-light area 119 for generating
HOLOGRAM RECORDING/REPRODUCING DEVICE AND RECORDING/REPRODUCING OPTICAL APPARATUS

CROSS-REFERENCE TO RELATED APPLICATIONS

The present application claims priority from Japanese Patent Application No. JP 2005-270240 filed on Sep. 16, 2005, the disclosure of which is hereby incorporated by reference herein.

BACKGROUND OF THE INVENTION

1. Field of the Invention

The present invention relates to a hologram recording/reproducing device and a recording/reproducing optical apparatus using the hologram recording/reproducing device.

2. Description of the Related Art

A hologram recording device and a hologram recording method, used for recording data using holography, are proposed. In the device and method, reference light and signal light, modulated by information to be recorded (record data), are generated by the same laser light source, and are used to irradiate a hologram recording/reproducing medium. This causes the signal light and the reference light to interfere with each other at the hologram recording/reproducing medium to form a diffraction grating (hologram) in the hologram recording/reproducing medium, so that the record data is recorded in the form of the diffraction grating (hologram).

A hologram reproducing device and a hologram reproducing method, used for reproducing the record data from the diffraction grating (hologram) recorded in this way, are proposed. In the device and method, when the diffraction grating (hologram) formed on the recording medium to which the recording has been performed is irradiated with the reference light, diffraction light (that is, reproduction light) is generated. The reproduction light is detected by a light-receiving element to reproduce the record data.

Two types of recording/reproducing methods are proposed for generating the signal light and the reference light in such a recording operation and a reproducing operation. They are a two-beam interference recording/reproducing method and a collinear recording/reproducing method. In the two-beam interference recording/reproducing method, a path of the signal light and a path of the reference light are completely separately provided, whereas, in the collinear recording/reproducing method, the signal light and the reference light are disposed on the same axis and share one path. In the collinear recording/reproducing method, a reference-light pattern is formed at an outer peripheral portion of a spatial-light modulator (SLM) and a signal-light pattern is formed at an inner peripheral portion of the spatial-light modulator to record them on a recording medium. In addition, only the reference-light pattern is formed at the outer peripheral portion of the spatial-light modulator, and reproduction light is obtained from the recording medium to which the recording has been performed to reproduce record data (refer to, for example, U.S. Pat. No. 6,108,110 and Nikkei Electronics (P 106 to 114 of the Jan. 17, 2005 issue).

A recording/reproducing optical unit 150, which is a main portion of a recording/reproducing device that performs a recording operation and a reproducing operation, is shown in FIG. 9. A transmissive collinear recording/reproducing method will be simply described with reference to the recording/reproducing optical unit 150 shown in FIG. 9.

Information is recorded in the following way. A light beam emitted from a laser light source 101 for recording and reproducing the information is incident upon a spatial-light modulator 103 through a collimator lens 102. The spatial-light modulator 103 spatially divides the light beam into light-beam portions, one portion becoming signal light 108 having a light-intensity modulation pattern reflecting record information and the other portion becoming reference light 109 which is not subjected to light intensity modulation or which is subjected to a particular light intensity modulation. These portions of the light beam reach an objective lens 104. For the spatial-light modulator 103, for example, a combination of a polarizing plate and an array liquid crystal panel is used. Since the signal light 108 and the reference light 109 pass through the same objective lens 107, the recording/reproducing method is called the collinear recording/reproducing method. The objective lens 104 causes the signal light 108 and the reference light 109 to form an interference fringe, that is, a hologram, at an information recording layer in a transmissive hologram recording/reproducing medium 307.

The information is reproduced in the following way. A light beam emitted from the laser light source 101 is transmitted through the collimator lens 102 and reaches the spatial-light modulator 103. The signal light 108 generated from the light beam is blocked by the spatial-light modulator 103 whose transmissivity is controlled to 0%, so that only the reference light 109 illuminates the recorded hologram through the objective lens 104. The light beam that has been diffracted by the hologram in the transmissive hologram recording/reproducing medium 307 passes through a condenser lens 105 to form a reproduction image on an array light detector 106 and to detect a spatial distribution of light intensity of the reproduction image by the light detector 106. Here, the light detector 106 is an array light detector, such as a CCD sensor or a C-MOS sensor.

In the collinear recording/reproducing method, the recording/reproducing optical unit may be a reflective type. FIG. 10 shows an example of a structure of a reflective collinear recording/reproducing optical unit 151. Parts of the optical unit 151 having structural features and functions that are similar to those of the optical unit 150 shown in FIG. 9 will be given the same reference numerals and will not be described below. In a reflective collinear recording/reproducing method, a reflective hologram recording/reproducing medium 207 having a reflective film at the back of an information recording layer is used. Recording of information in the reflective type is substantially the same as that in the transmissive type. A difference is that signal light 108 and reference light 109 pass through a beam splitter 110 to form a hologram at the information recording layer in the hologram recording/reproducing medium 207 by the objective lens 104. The information is reproduced as follows. A light beam that has been diffracted and reflected by the hologram in the hologram recording/reproducing medium 207 passes through the objective lens 104 again and is reflected by the beam splitter 110, so that a reproduction image is formed on an array light detector 106 and a spatial distribution of light intensity of the reproduction image is detected by the light detector 106.

FIG. 11 shows an example of a pattern disposed at the spatial-light modulator 103 for splitting the signal light 108 and the reference light 109 transmitted through the spatial-light modulator 103 of the hologram recording/reproducing device. In general, a signal-light area 118 for generating the signal light 108 is disposed at an inner peripheral portion of the spatial-light modulator 103 where good optical performance is provided, a reference-light area 119 for generating the reference light 109 is disposed at an outer peripheral portion of the spatial-light modulator 103, and a gap is provided between the signal-light area 118 and the reference-light area 119.

To record a large amount of information on a hologram recording/reproducing medium, what is called multiplex recording for forming a plurality of holograms at one location (or overlapping areas) of the hologram recording/reproducing medium may be performed. Various multiplex recording methods are proposed (refer to, for example, Nikkei Electronics (P 106 to 114 of the Jan. 17, 2005 issue)).

FIG. 1 shows a result of simulation of light intensity distributions near a focal plane of the signal light 108 and a focal plane of the reference light 109, in a range of a recording-surface cross section (that is perpendicular to a recording/reproducing surface) of the hologram recording/reproducing medium 207. In FIG. 1, dark-colored portions A indicate main portions of the reference light 109, and a light-colored portion B indicates a main portion of the signal light 108. Here, the reflective collinear recording/reproducing device shown in FIG. 10 is used as a recording/reproducing device, and the spatial modulation pattern shown in FIG. 11 is used. When the recording/reproducing device and the spatial modulation pattern according to the related art are used, as is clear from FIG. 1, the reference light 109 and the signal light 108 interfere with each other only at a small area near the focal planes of the signal light 108 and the reference light 109 (that is, the lower portion at the center in FIG. 1).

In other words, FIG. 1 shows that a hologram is only formed at the small area near the focal planes in a hologram medium. In general, a hologram medium having a thickness on the order of from 0.5 mm to 1 mm is used, on the basis of the expectation that, if the thickness of the medium increases, the number of multiplexings is increased, so that recording density is increased. As is clear from the simulation result shown in FIG. 1, the feature expected of hologram recording that increasing the thickness of the medium increases the number of multiplexings and, thus, the recording density is not made use of. Therefore, the information recording layer disposed in the hologram recording/reproducing medium 207 is not effectively used. In other words, that the thickness of the medium substantially does not contribute to increasing the recording density and the information recording layer is wastefully used is shown in FIG. 1.

Accordingly, it is desirable to provide a hologram recording/reproducing device which can considerably increase an area of interference between reference light and signal light in a medium as compared to that in a related method, to solve such a problem, and which does not wastefully use an information recording layer, that is, which effectively makes use of the information recording layer to increase recording density. It is also desirable to provide an optical apparatus using the hologram recording/reproducing device.

SUMMARY OF THE INVENTION

According to an embodiment of the present invention, there is provided a hologram recording/reproducing device including a recording/reproducing optical unit that records information onto a hologram recording/reproducing medium and that reproduces the information from the hologram recording/reproducing medium. The recording/reproducing optical unit includes a laser light source, a spatial-light modulator, a phase mask, and an objective lens. The laser light source emits laser light. The spatial-light modulator generates signal light and reference light from the laser light, the signal light and the reference light having a common light path. The phase mask is disposed either near the spatial-light modulator or in a conjugate plane of the spatial-light modulator and transmits at least the reference light. The objective lens includes a first lens portion and a second lens portion. The first lens portion is disposed at an inner peripheral portion of the objective lens and serves as a Fourier transformation lens that focuses the signal light to a predetermined point. The second lens portion is disposed at an outer peripheral portion of the objective lens and serves as a lens having focuses that are continuously or discretely disposed in an optical-axis direction of the objective lens and at portions in the hologram recording/reproducing medium near the predetermined point where the signal light is focused.

The hologram recording/reproducing device having such a structure includes a recording/reproducing optical unit and can record information onto and reproduce information from the hologram recording/reproducing medium as a hologram. The recording/reproducing optical unit operates as follows. The laser light source emits laser light. The spatial-light modulator generates signal light and reference light from the laser light, the signal light and the reference light having a common light path. The phase mask that is disposed near the spatial-light modulator or in the conjugate plane of the spatial-light modulator and that transmits at least the reference light spreads focuses of the reference light in the recording/reproducing medium. The objective lens focuses the signal light and the reference light onto the hologram recording/reproducing medium. The first lens portion is formed at the inner peripheral portion of the objective lens so as to serve as a Fourier transformation lens that focuses the signal light to a predetermined point. The second lens portion is formed at the outer peripheral portion of the objective lens so as to serve as a lens having focuses that are continuously or discretely disposed in an optical-axis direction of the objective lens and at portions in the hologram recording/reproducing medium near the predetermined point where the signal light is focused. That is, a synergistic action between the phase mask and the second lens portion causes convergent points of the reference light to be spread three dimensionally in the hologram recording/reproducing medium.

According to another embodiment of the present invention, there is provided a recording/reproducing optical apparatus that records information onto and reproduces the information from a hologram recording/reproducing medium. The recording/reproducing optical apparatus includes a laser light source, a spatial-light modulator, a phase mask, and an objective lens. The laser light source emits laser light. The spatial-light modulator generates signal light and reference light from the laser light, the signal light and the reference light having a common light path. The phase mask is disposed either near the spatial-light modulator or in a conjugate plane of the spatial-light modulator and transmits at least the reference light. The objective lens includes a first lens portion and a second lens portion. The first lens portion is disposed at an inner peripheral portion of the objective lens and serves as a Fourier transformation lens that focuses the signal light to a predetermined point. The second lens portion is disposed at an outer peripheral portion of the objective lens and serves as a lens having focuses that are continuously or discretely disposed in an optical-axis direction of the objective lens and at portions in the hologram recording/reproducing medium near the predetermined point where the signal light is focused.

In the optical apparatus having such a structure the laser light source emits laser light. The spatial-light modulator generates signal light and reference light from the laser light, the signal light and the reference light having a common light path. The phase mask that is disposed near the spatial-light modulator or in the conjugate plane of the spatial-light modulator and that transmits at least the reference light spreads focuses of the reference light in the recording/reproducing medium. The objective lens focuses the signal light and the reference light onto the hologram recording/reproducing medium. The first lens portion is formed at the inner peripheral portion of the objective lens so as to serve as a Fourier transformation lens that focuses the signal light to a predetermined point. The second lens portion is formed at the outer peripheral portion of the objective lens so as to serve as a lens having focuses that are continuously or discretely disposed in an optical-axis direction of the objective lens and at portions in the hologram recording/reproducing medium near the predetermined point where the signal light is focused. That is, a synergistic action between the phase mask and the second lens portion causes convergent points of the reference light to be spread three dimensionally in the hologram recording/reproducing medium.

According to the embodiments of the present invention, it is possible to provide a hologram recording/reproducing device in which only the thickness of a medium contributes to increasing recording density and in which an information recording layer is not wastefully used, and to provide a recording/reproducing optical apparatus using the hologram recording/reproducing device.

DETAILED DESCRIPTION

A recording/reproducing device that is described below can perform a recording operation and a reproducing operation. The recording/reproducing device includes a structural unit (recording unit) that contributes to performing the recording operation and a structural unit (reproducing unit) that contributes to performing the reproducing operation. A device including the recording unit is a hologram recording device and a device including the reproducing unit is a reproducing device. In the description below, these devices will be described as being in combination.

Figure 2:
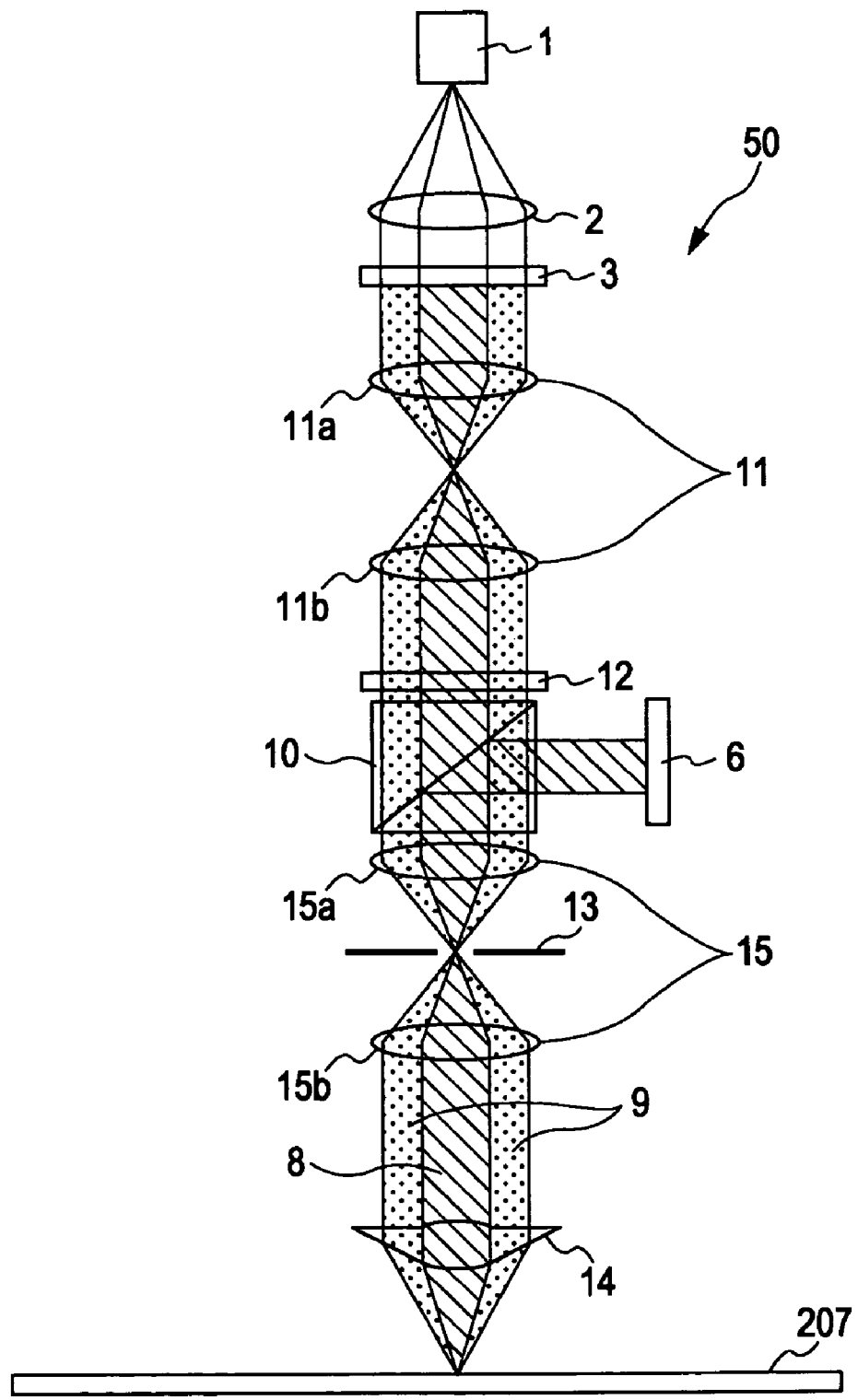
FIG. 2 shows a structure of a recording/reproducing optical unit according to an embodiment.
Figure 10:
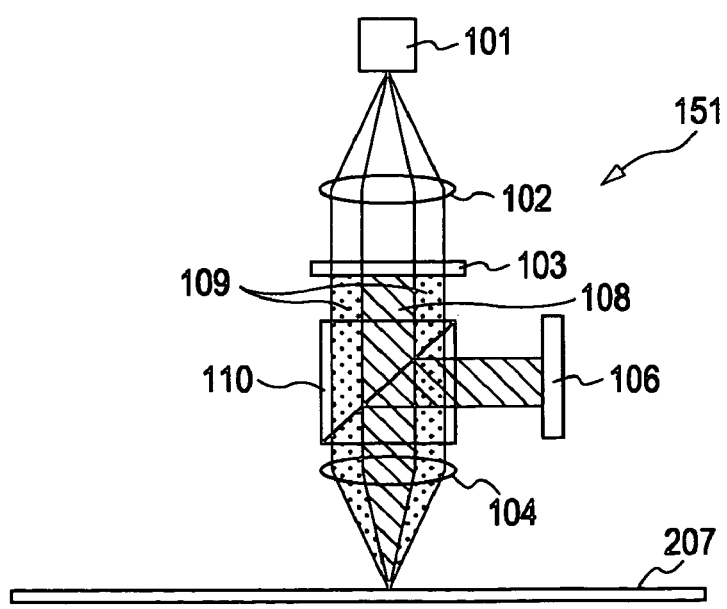
FIG. 10 shows a structure of another related recording/reproducing device.

A recording/reproducing optical unit 50 shown in FIG. 2 is a main portion of the recording/reproducing device according to an embodiment. There are three big differences between it and the related recording/reproducing optical unit 151 shown in FIG. 10. The first difference is that an objective lens 14 is used. A portion of the objective lens 14 where signal light 8 passes is a usual Fourier transformer lens portion 14a and a portion of the objective lens 14 where reference light 9 passes is an Axicon lens (conical lens) portion 14b. The second difference is that a phase mask 12 is disposed in an optical conjugate plane of a spatial-light modulator (SLM) 3 through a first relay lens system 11. The third difference is that an aperture 13 is disposed in a Fourier plane in a second relay lens system 15 with respect to the phase mask 12 and the spatial-light modulator 3, that is, in a conjugate plane of a hologram recording/reproducing medium.

The recording/reproducing optical unit shown in FIG. 2 includes a structural unit contributing to a recording operation and a structural unit contributing to a reproducing operation. The structural unit contributing to a recording operation constitutes an optical device that records information onto a hologram recording/reproducing medium (that is, a recording optical unit of a hologram recording device). The structural unit contributing to a reproducing operation constitutes an optical device that reproduces the information from the hologram recording/reproducing medium (that is, a reproducing optical unit of a hologram reproducing device. In the description below, these devices will be described as being in combination.

Hologram Recording/Reproducing Device

Figure 7:
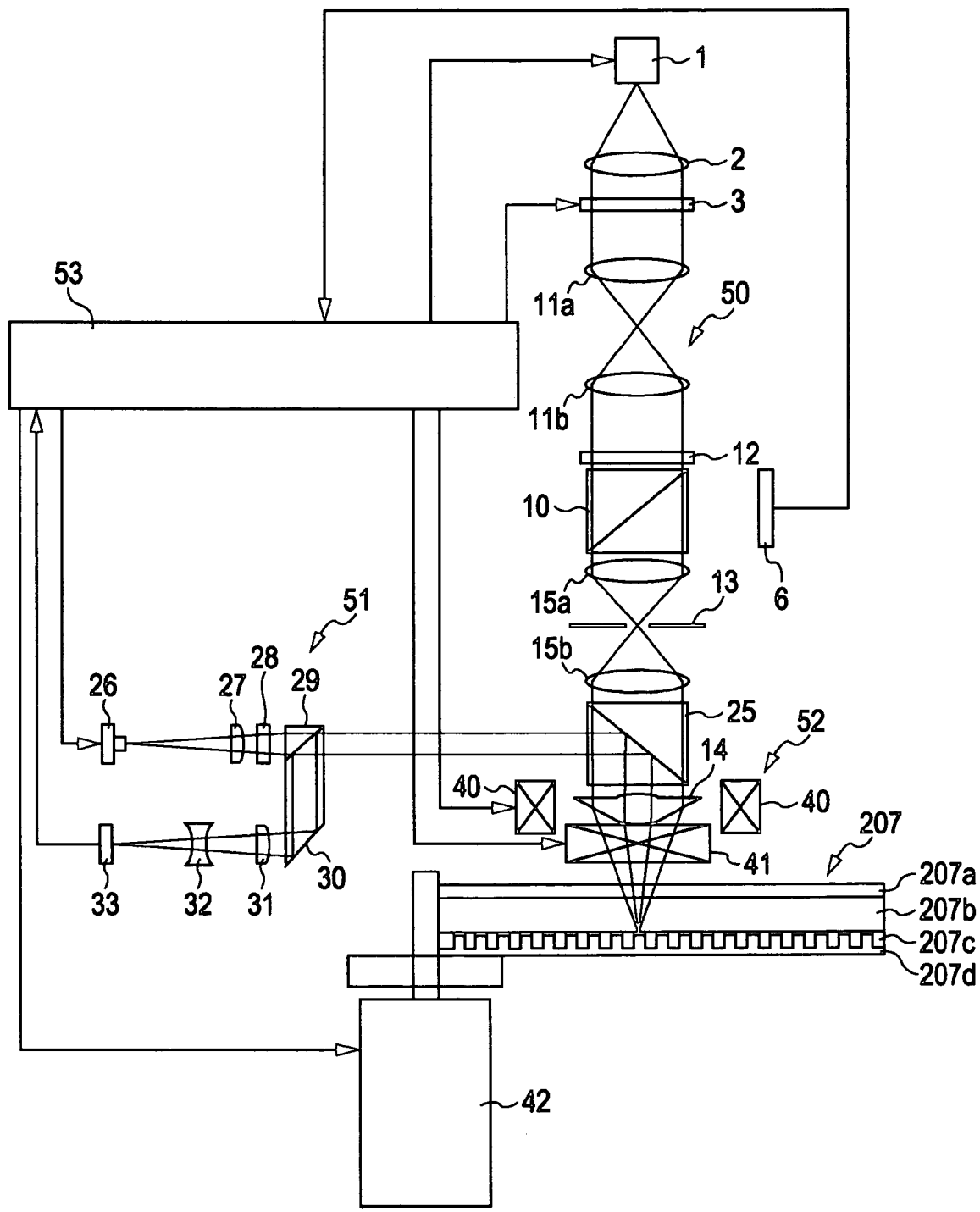
FIG. 7 shows a structure of a recording/reproducing device according to the embodiment.

The hologram recording/reproducing device according to the embodiment includes the following main structural units, that is, the recording/reproducing optical unit 50, a servo optical unit 51 (see FIG. 7), a servo mechanical unit 52 (also see FIG. 7), and a signal processing/controlling unit 53 (also see FIG. 7).

Recording/Reproducing Optical Unit

The recording/reproducing optical unit 50, which is a main portion of the hologram recording/reproducing device according to the embodiment, will be described. The recording/reproducing optical unit 50 includes a recording/reproducing laser light source 1, a collimator lens 2, the spatial-light modulator 3, an array light detector 6, a beam splitter 10, the first relay lens system 11, the phase mask 12, the aperture 13, the objective lens 14, and the second relay lens system 15.

Figure 11:
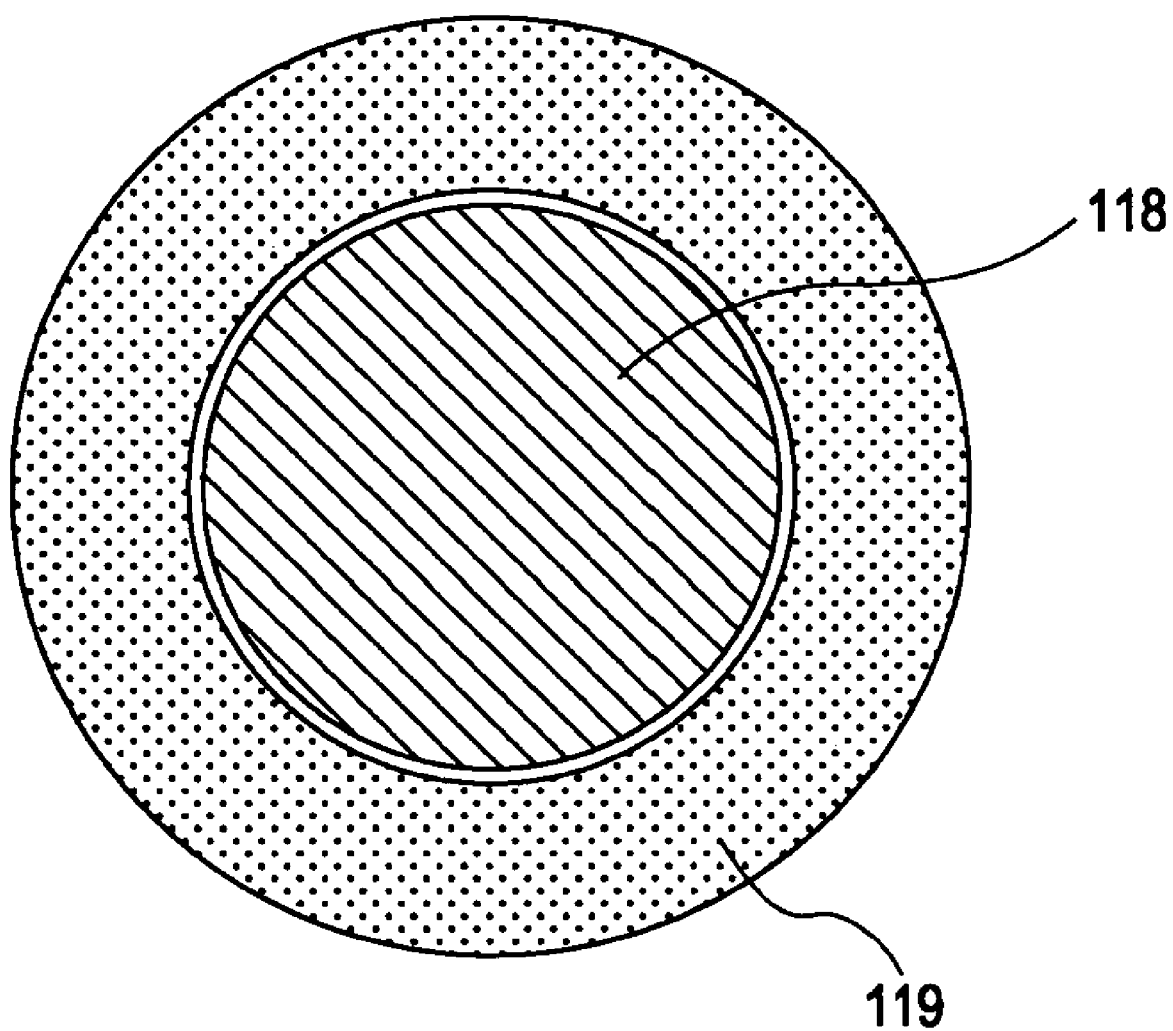
FIG. 11 shows an example of a pattern of a spatial-light modulator.

The laser light source 1 is, for example, a laser diode (LD) having a wavelength of 405 nm. The collimator lens 2 collimates a light beam emitted from the laser light source 1. The spatial-light modulator 3 is an optical element that spatially (two dimensionally) modulates the signal light 8 on the basis of information (record data) and that spatially (two-dimensionally) modulates the reference light 9 on the basis of a predetermined pattern. For example, a transmissive liquid crystal element is used for the spatial-light modulator 3. As in FIG. 11, a circular signal-light area 118 and a reference-light area 119, which is provided for the reference light and surrounds the signal-light area 118, are provided at the spatial-light modulator 3. The signal light 8 and the reference light 9 are separated from each other by the spatial-light modulator 3. When reproduction is performed, the circular signal-light area 118 is not used. At the spatial-light modulator 3, it is possible that an illumination area of the reference light 9 be only specified, and the reference light 9 not be spatially modulated on the basis of a predetermined pattern.

Figure 3:
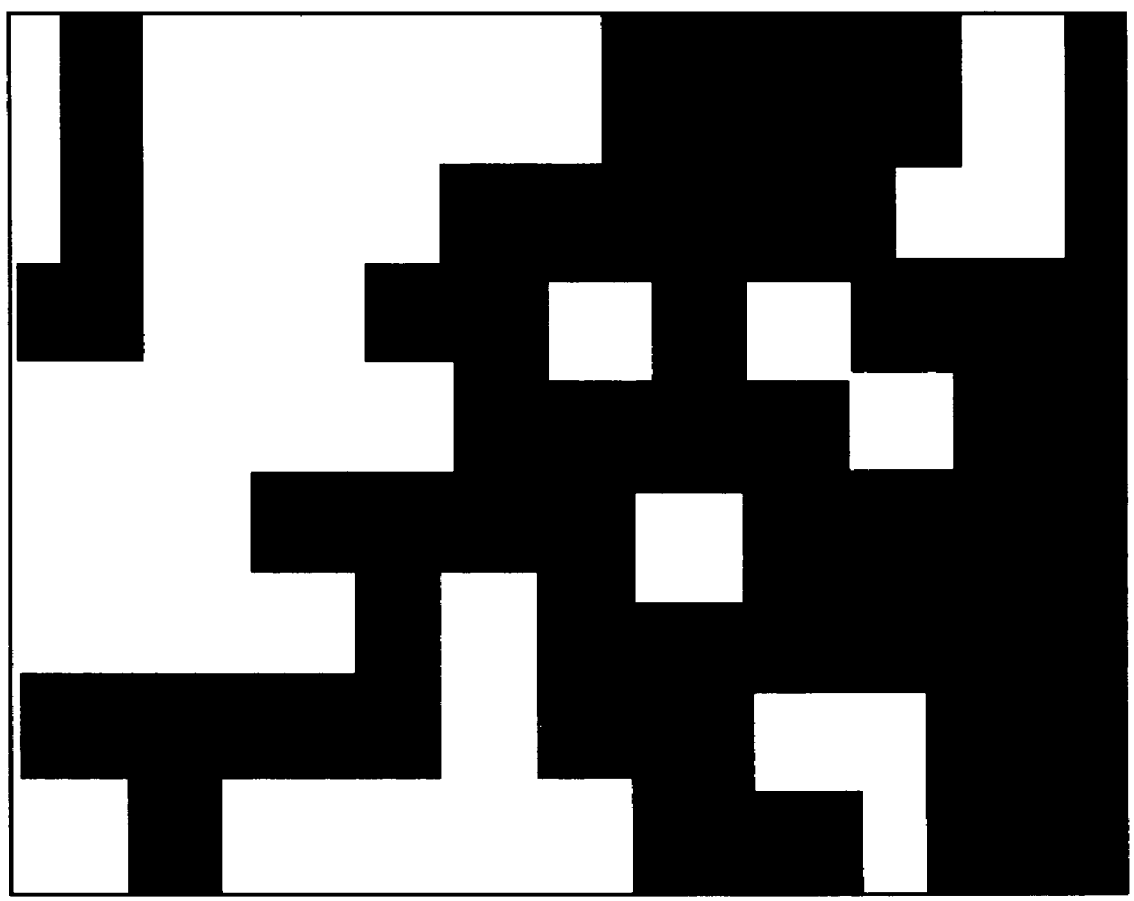
FIG. 3 shows an example of a pattern of a phase mask.

The first relay lens system 11 includes a pair of lenses 11a and 11b, and is provided to form an optical conjugate plane of the spatial-light modulator 3. The phase mask 12 is disposed in the optical conjugate plane of the spatial-light modulator 3 through the first relay lens system 11. The phase mask 12 is formed of, for example, glass or transparent resin. It is an optical element in which, with a pixel that is a minimum unit displayed on the spatial-light modulator 3 being a unit, a pattern is randomly disposed in a plane direction and in which two different phase depths are provided in a direction perpendicular to the plane. FIG. 3 shows a portion of a surface of the phase mask 12 that is perpendicular to a light beam (that is, in the plane direction). For example, a dark-colored portion represents a portion where the phase depth is large. The phase mask 12 will be described in more detail below.

The beam splitter 10 is an optical part that transmits the light beam that is to illuminate a hologram recording/reproducing medium 207 and guides the returning light beam reflected from the hologram recording/reproducing medium 207 to the array light detector 6. The second relay lens system 15 includes a pair of lenses 15a and 15b, and forms the Fourier plane with respect to the spatial-light modulator 3 and the phase mask 12, that is, the conjugate plane of the hologram recording/reproducing medium. The aperture 13 is formed by a plate member that is disposed in the conjugate plane of the aforementioned hologram recording/reproducing medium and that has a circular opening.

Figure 4:
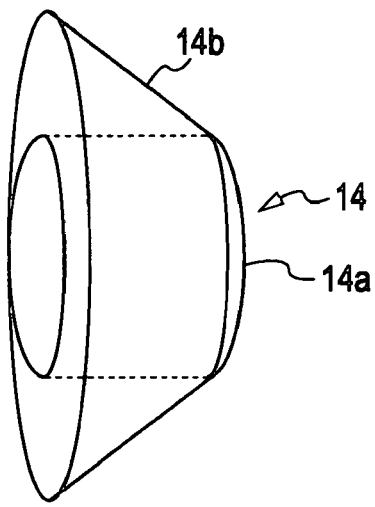
FIG. 4 is a perspective view of an objective lens according to the embodiment.

FIG. 4 that shows a structure of the objective lens 14. As shown in FIG. 4, the portion of the objective lens 14 where the signal light 8 passes is the Fourier transformer lens portion 14a having a function that is similar to that of a usual Fourier transformer lens. In addition, the portion of the objective lens 14 where the reference light 9 passes is the Axicon lens portion 14b having a function that is similar to that of an outer peripheral portion of an Axicon lens (conical lens). The objective lens 14 will be described in more detail below.

The array light detector 6 is a detector that detects a two-dimensional change in light quantity. For the array light detector 6, for example, a CCD sensor or a C-MOS sensor is used. When only a recording operation is performed, the array light detector 6 is not used.

Next, after simply describing the operations of the recording/reproducing optical unit 50 when a recording operation and a reproducing operation are performed, the distinctive features, that is, the operation of the objective lens 14, the operation of the phase mask 12, and the operation of the aperture 13, will be described.

When the recording operation is to be performed, a light beam emitted from the laser light source 1 is collimated by the collimator lens 2, and the parallel light beam is incident upon the spatial-light modulator 3. The signal light 8 and the reference light 9 that have been generated by the spatial-light modulator 3 pass through the first relay lens system 11, and are incident upon the phase mask 12. The signal light 8 and the reference light 9 that have passed through the phase mask 12 pass through the beam splitter 10 and the lens 15a of the second relay lens system 15, are incident upon the aperture 13, disposed in the conjugate plane of the hologram recording/reproducing medium, and pass through the opening of the aperture 13. Then, the signal light 8 and the reference light 9 pass through the lens 15b of the second relay lens system 15. Thereafter, the signal light 8 passes through the Fourier transformation lens portion 14a of the objective lens 14, and the reference light 9 passes through the Axicon lens portion 14b of the objective lens 14, so that the signal light 8 and the reference light 9 interfere with each other in the hologram recording/reproducing medium 207 to form a hologram.

Figure 5:
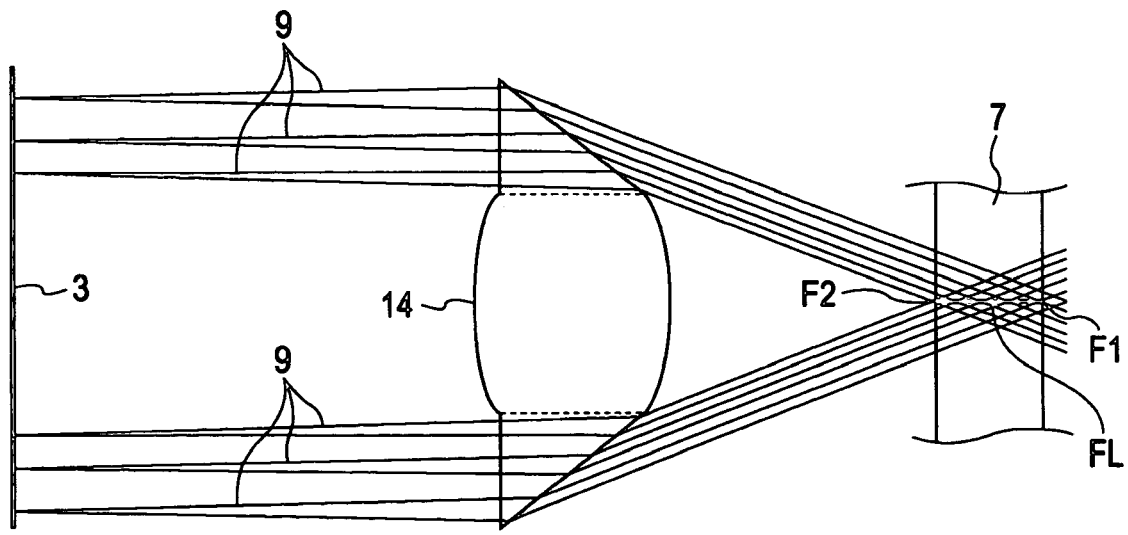
FIG. 5 illustrates an operation of a second lens portion of the objective lens.

Here, the operation of the objective lens 14 will be described with reference to FIG. 5. FIG. 5 shows beams of the reference light 9 exiting from the spatial-light modulator 3 and passing through the Axicon lens portion 14b forming the outer peripheral portion of the objective lens 14. The Axicon lens portion 14b may be considered as what is called a continuous-focus lens portion in which focuses thereof are disposed closer to the lens portion with the height of the reference light. Accordingly, as shown in FIG. 5, when the hologram recording/reproducing medium 207 is disposed in a range extending from a point F1 near the focus of the outermost beams to a point F2 near the focus of the innermost beams, the signal light 8 focused at the Fourier transformation lens portion 14a (disposed at the center of the objective lens 14) interferes with the reference light 9 that is widened to the range extending from the points F1 to F2. This makes it possible to overcome the problem of the phenomenon shown in FIG. 1 occurring when the related objective lens 104, which is entirely formed by a Fourier transformation lens, is used as in FIG. 1, that is, to prevent concentration of interference in a narrow range.

Here, even if such an objective lens 14 is used, when the phase mask 12 is not used, the light beams in the medium shown in FIG. 5 are actually converged due to interference, so that the light beams remain converged in a direction perpendicular to a recording surface of the hologram recording/reproducing medium 207, that is, a focal line FL is formed. Therefore, the area of interference between the signal light 8 and the reference light 9 is not sufficiently widened.

Figure 6:
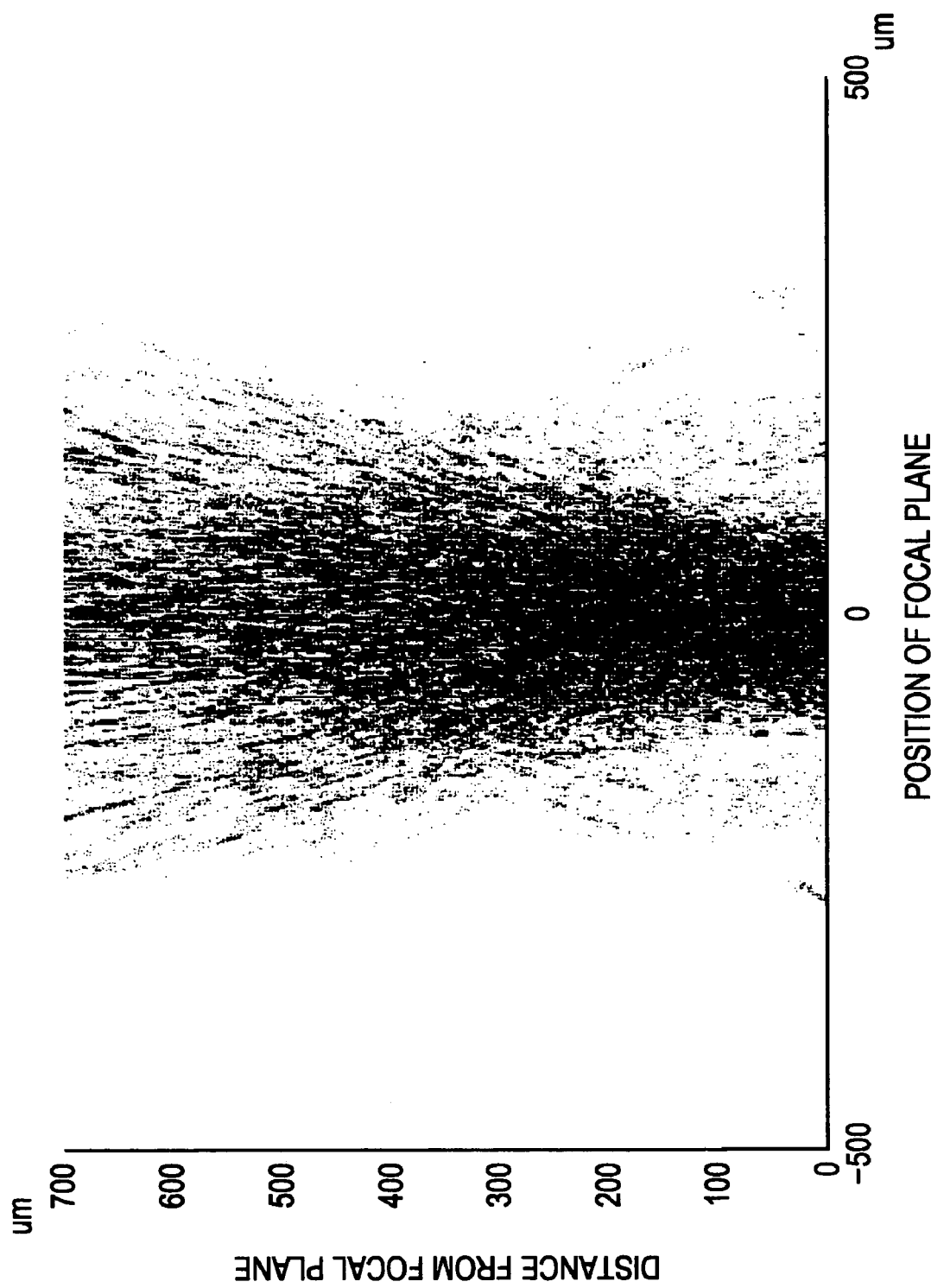
FIG. 6 shows a result of simulation of distributions of intensities of signal light and reference light in a hologram recording/reproducing medium, when a recording method according to the embodiment is used.

To overcome this problem, it is possible to use the above-described phase mask 12 to widen the distribution of the reference light 9, which is concentrated at the focal line FL, in a direction parallel to the recording surface of the hologram recording/reproducing medium 207 (that is, in a vertical direction in FIG. 5). FIG. 6 shows results of simulation of distributions of intensities of the signal light 8 and the reference light 9 near their focal planes, in a range of a recording-surface cross section of the hologram recording/reproducing medium 207 (in a plane perpendicular to a recording/reproduction surface). These results are obtained when the objective lens 14, including the Axicon lens portion 14b, and the phase mask 12, which has two different depths for the reference light 9 and which has a pixel size that is the same as that of the spatial-light modulator 3, are used in combination.

Figure 1:
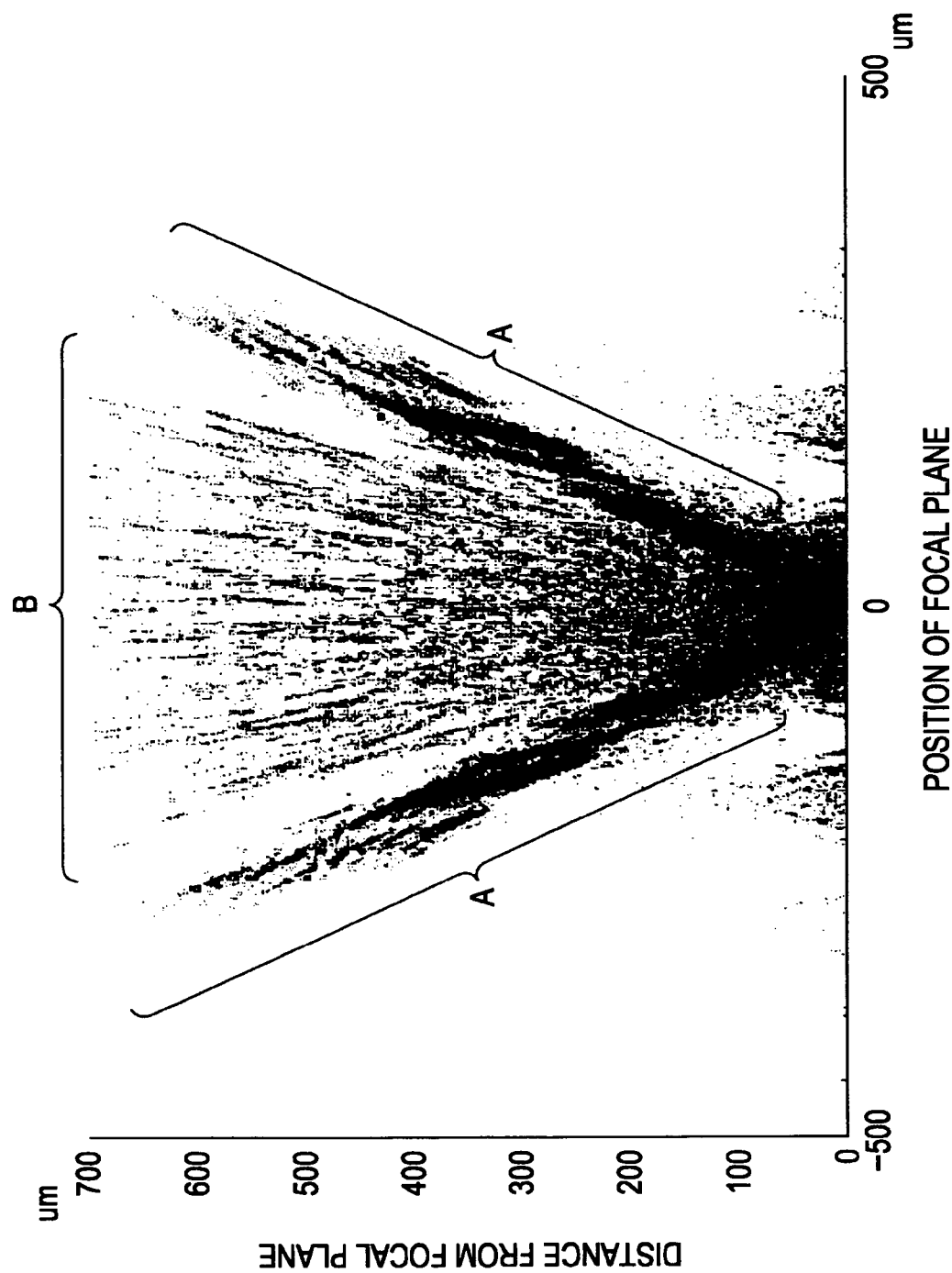
FIG. 1 shows a result of simulation of distributions of intensities of signal light and reference light in a hologram recording/reproducing medium in a related art.

As can be easily understood from FIG. 6, the range of the signal light 8 is substantially the same as that shown in FIG. 1, but the range of the reference light 9 is increased, so that the signal light 8 and the reference light 9 spatially efficiently overlap each other to record a hologram in a wide range of the hologram recording/reproducing medium 207.

The size of the hologram can be adjusted to a suitable size by putting limitations by the aperture 13 on the size of the hologram that is recorded.

Next, the reproducing of information will be described. A light beam emitted from the laser light source 1 passes through the collimator lens 2 and reaches the spatial-light modulator 3. The signal light 8 generated from the light beam is blocked by the spatial-light modulator 3 whose transmissivity is controlled to 0%, so that the hologram that has been recorded on the hologram recording/reproducing medium 207 is illuminated with only the reference light 9 through the objective lens 14. The light beam (the reference light 9) that has been diffracted by the hologram in the hologram recording/reproducing medium 207 is reflected by the beam splitter 10 to form a reproduction image on the array light detector 6, after which a spatial distribution of light intensity of the reproduction image is detected by the array light detector 6.

Modifications of the Embodiment

Although, in the embodiment, the second lens portion of the objective lens 14 has an Axicon lens form, the same operational advantages can be provided by other lens forms. For example, the objective lens may include a first lens portion that focuses the signal light 8 incident thereupon from the inner peripheral portion of the objective lens and a second lens portion that focuses the reference light 9 incident thereupon from the outer peripheral portion of the objective lens. In the objective lens, the first lens portion is formed as a Fourier transformation lens that focuses the signal light 8 to a predetermined point, and the second lens portion is formed as a lens having continuously or discretely disposed focuses near the predetermined point where the signal light 8 is focused.

A specific example of the second lens portion that may be used instead of an Axicon lens is an aspherical lens that provides the same advantages. In addition, the second lens portion may be formed as an aspherical lens integrally formed with the first lens portion. Further, the focuses continuously disposed in a direction perpendicular to the medium plane may be discretely disposed. Still further, intervals between the focuses that are adjacent to each other may be unequally set. For example, when the intervals between the adjacent focuses are unequally set, what is called a bifocal lens in which a peripheral lens portion has one focus that is closer to the lens than the focus of the signal light may be ultimately used. Still further, instead of being formed of one lens portion, the second lens portion may be one having a plurality of refractive/reflective spherical or aspherical surfaces so as to provide the same advantages as those of the Axicon lens. Still further, the second lens portion may be formed by adhering to a Fourier transformation lens a concentric lens whose outermost peripheral portion has the same diameter as that of the Fourier transformation lens.

The above-described first and second lens portions each have an infinite rotational symmetrical form. This is to prevent limitations from being placed on the mounting direction of the objective lens when manufacturing the recording/reproducing device. Therefore, when a plurality of recording/reproducing devices are used, and a hologram recording/reproducing medium is not compatible, the objective lens may have a form other than a rotational symmetrical form. To reproduce a plurality of objective lenses, the form of the objective lenses is made relatively simple. When a plurality of objective lenses are not reproduced, the objective lens may have a form that is difficult to specify by, for example, a formula in a standardization.

In the embodiment, the phase mask 12 is such that a random pattern having a phase structure corresponding to a pixel size of the spatial-light modulator 3 is formed at a surface upon which the reference light 9 is perpendicularly incident and such that two or more different phase depths are provided in the incidence direction of the reference light 9. However, the minimum unit of the pattern in the phase mask may differ from the minimum pixel. In addition, the number of phase variations is not limited to two, so that there may be more than two phase variations. In other words, the selection of the minimum unit of the pattern and the selection of the randomness of the pattern in the phase mask may be performed as appropriate. In addition, in accordance with the circumstances, the minimum unit of the pattern, the random arrangement, and the number of phase variations may be selected as appropriate. Further, the selections may be combined as appropriate.

For example, when the size of a pixel formed at the spatial-light modulator 3 and the minimum unit of the pattern of the phase mask are to be made the same, it is possible to use one phase mask having the same phase pattern, for the reference light 9 and the signal light 8. In contrast, when the size of the pixel formed by the spatial-light modulator 3 with the reference light 9 is to be made different from the minimum unit of the structure of the phase mask 12, it is possible to use one phase mask having two types of phase structures having divided areas, with respect to a phase mask for the signal light 8 in which the minimum unit of the structure of the phase mask 12 is equal to the size of the pixel formed at the spatial-light modulator 3. In particular, when a random phase mask in which the minimum unit of the phase structure equals the size of the pixel formed at the spatial-light modulator 3 is also used for the signal light 8, the advantage of restricting a DC component thereof may be provided.

Although the phase mask 12 according to the embodiment is disposed in the optical conjugate plane of the spatial-light modulator 3 through the first relay lens system 11, even if the phase mask 12 is disposed very near the spatial-light modulator, such as within 100 μm, without using the first relay lens system 11, the same advantages can be provided.

The recording/reproducing devices according to the embodiment and the modifications provide the following advantages with respect to the related recording/reproducing device.

First, when the objective lens 14 according to the embodiment or any one of the modified forms of the objective lens 14 is used, in the recording operation, the reference light 9 is focused at a plurality of points in the thickness direction of the hologram recording/reproducing medium 207 or is focused continuously in the thickness direction of the hologram recording/reproducing medium 207. Therefore, the area of interference between the signal light 8 and the reference light 9 is increased, so that the area where a hologram is formed is increased in the thickness direction of the hologram recording/reproducing medium 207. In the reproducing operation, the reference light 9 is focused at a plurality of points in the thickness direction of the hologram recording/reproducing medium 207 or is focused continuously in the thickness direction of the hologram recording/reproducing medium 207. Therefore, the area of interference of the reference light 9 with the hologram is increased, so that a reproduction light level is increased.

When the objective lens 14 according to the embodiment or any one of the modified forms of the objective lens 14 and the phase mask 12 according to the embodiment or any one of the modified forms of the phase mask 12 are used, in the recording operation, the reference light 9 is focused at a plurality of points in the thickness direction of the hologram recording/reproducing medium 207 or is focused continuously in the thickness direction of the hologram recording/reproducing medium 207. In addition, the reference light 9 is focused so as to spread in the plane direction of the hologram recording/reproducing medium 207. Therefore, the area of interference between the signal light 8 and the reference light 9 is increased, so that the area where a hologram is formed is increased in the thickness direction and the plane direction of the recording/reproducing medium. In the reproducing operation, the reference light 9 is focused at a plurality of points in the thickness direction of the hologram recording/reproducing medium 207 or is focused continuously in the thickness direction of the hologram recording/reproducing medium 207. In addition, the reference light 9 is focused so as to spread in the plane direction of the hologram recording/reproducing medium 207. Therefore, the area of interference of the reference light 9 with the hologram is further increased, so that a reproduction light level is further increased. That is, by a synergistic action between the phase mask and the second lens portion, it is possible to spread the reference light in a wide three-dimensional area in the hologram recording medium.

The aperture 13 according to the embodiment may be used along with the objective lens 14 according to the embodiment or any one of the modified forms of the objective lens 14 and the phase mask 12 according to the embodiment or any one of the modified forms of the phase mask 12. In this case, in both the recording operation and the reproducing operation, the same advantages as those that are provided when the objective lens 14 according to the embodiment or any one of the modified forms of the objective lens 14 and the phase mask 12 according to the embodiment or any one of the modified forms of the phase mask 12 are used are provided. In addition, in this case, by adjusting the size of the reference light 9 in the hologram recording/reproducing medium 207, the size of a hologram can be adjusted to a proper size, so that the hologram recording/reproducing medium 207 is not wastefully used.

The use of the objective lens 14, the phase mask 12, and the aperture 13 together is considerably effective particularly in multiplex recording in which a plurality of holograms corresponding to a plurality of pieces of information are recorded as a result of overlapping them in the same hologram recording area. This is because, since the multiplex recording can be performed in a wide hologram recording area (multiplex recording is performed in a narrow area in the related art), an adequate signal-to-noise (S/N) ratio can be obtained even if the number of multiplex recording operations is increased.

Hologram Recording/Reproducing Medium, Servo Optical Unit, Servo Mechanical Unit, and Signal Processing/Controlling Unit The hologram recording/reproducing medium 207, the servo optical unit 51, the servo mechanical unit 52, and the signal processing/controlling unit 53 will be simply described with reference to FIG. 7.

First, the hologram recording/reproducing medium 207 will be simply described.

The hologram recording/reproducing medium 207 is a medium on which a hologram recording operation and a hologram reproducing operation are performed by the use of the recording/reproducing optical unit 50. The hologram recording/reproducing medium 207 is a disc-shaped medium, includes a protective layer 207a, a recording layer 207b, a groove 207c, and a reflective layer 207d, and is used to record an interference fringe, as a hologram, formed by the signal light 8 and the reference light 9. A boundary between the recording layer 207b and the groove 207c is provided with a dichroic film that reflects light from a hologram recording/reproducing light source and that transmits light from a servo light source. The protective layer 207a is a layer for protecting the recording layer 207b from the surrounding, and the recording layer 207b is used to record the interference fringe as a change in refractive index. If a material whose refractive index changes with the intensity of light is used, for example, lithium niobate ($LiNbO_3$) may be used as an inorganic material or, for example, a photopolymer may be used as an organic material. The refractive index of the recording layer 207b is changed in accordance with exposure amount, so that the interference fringe formed by interference between the reference light 9 and the signal light 8 can be recorded as a change in the refractive index on the hologram recording/reproducing medium 207.

Next, the servo optical unit 51 will be simply described.

The servo optical unit 51 shares the use of the objective lens 14 with the recording/reproducing optical unit 50. Therefore, the servo optical unit 51 includes a dichroic mirror 25 which is a wavelength selection element.

A servo light source 26 is a light source for performing servo control, such as a tracking servo control operation and a focus servo control operation, and for reading an address signal. The servo light source 26 emits laser light having a wavelength that differs from that of the laser light emitted from the laser light source 1. The servo light source 26 is a laser diode which has an oscillation wavelength, such as 650 nm, having a small sensitivity with respect to the recording layer 207b of the hologram recording/reproducing medium 207, so that it does not influence recording and reproducing operations and so that a servo signal is easily split.

A collimator lens 27 is an optical element that collimates the laser light emitted from the servo light source 26. A grating 28 is an optical element that splits the laser light that has exited from the collimator lens 27 into three light beams for servo control and for reading out an address signal.

A beam splitter 29 is an optical element that passes the laser light that has exited from the grating 28 and that reflects the returning light reflected by and returning from the hologram recording/reproducing medium 207. A mirror 30 is an optical element that reflects the returning light from the beam splitter 29 towards a light-receiving element 33.

A condenser lens 31 is an optical element that converges at the light-receiving element 33 the returning light from the mirror 30. A cylindrical lens 32 is an optical element that converts the light beam converged by the condenser lens 31 from a circular light beam to an elliptical light beam, for focus servo control. The light-receiving element 33 is an optical element that receives the returning light and outputs a tracking error signal for a tracking servo control operation, a focus error signal for a focus servo control operation, and an address signal. The light-receiving element 33 is, for example, a photodiode.

The servo mechanical unit 52 will be described.

The servo mechanical unit 52 includes a focus actuator 40 and a tracking actuator 41. The focus actuator 40 is a focus servo mechanism that drives the objective lens 14 perpendicularly to a surface of the hologram recording/reproducing medium 207 and controls the position of a spot of light that is focused by the objective lens 14. The tracking actuator 41 is a tracking servo mechanism that drives the objective lens 14 in a radial direction of the hologram recording/reproducing medium 207. The focus actuator 40 and the tracking actuator 41 perform a focus servo operation and a tracking servo operation, respectively, on the basis of a controlling operation by the signal processing/controlling unit 53. The servo mechanical unit 52 further includes a spindle motor 42 that rotates the hologram recording/reproducing medium 207.

The signal processing/controlling unit 53 will be described.

A calculating section including, for example, a central processing unit (CPU) and a digital signal processor (DSP) is a main portion of the signal processing/controlling unit 53. The signal processing/controlling unit 53 performs calculation as a result of receiving an electrical signal, to control the focus actuator 40, the tracking actuator 41, and the spindle motor 42.

In the foregoing description of the recording/reproducing optical unit 50, a recording/reproduction area on the hologram recording/reproducing medium 207 is specified to perform a recording or a reproducing operation. The specification of the area is performed by the operations of the servo optical unit 51, the servo mechanical unit 52, and the signal processing/controlling unit 53. A spindle servo operation, a focus servo operation, a tracking servo operation, and signal processing, which are performed for specifying the recording/reproduction area, will hereunder be simply described.

First, a light beam emitted from the servo light source 26 is transmitted through the collimator lens 27, the grating 28, the beam splitter 29, the dichroic mirror 25, and the objective lens 14. Then, the light beam is reflected by the reflective layer 207d, where the groove 207c is formed, of the hologram recording/reproducing medium 207, is transmitted again through the objective lens 14, the dichroic mirror 25, and the beam splitter 29, and is transmitted through the mirror 30, the condenser lens 31, the cylindrical lens 32, and reaches the light-receiving element 33. At this time, the light beam that is emitted from the servo light source 26 passes the central portion of the dichroic mirror 25 and the Fourier transformation lens portion 14a, and the diameter of the light beam for the servo operations is restricted so that it does not pass through the Axicon lens portion 14b.

The light-receiving element 33 has divided optical detector portions, and generates an electrical signal in accordance with the quantity of light received by each optical detector portion. The calculating section including, for example, the central processing unit (CPU) and the digital signal processor (DSP) is a main portion of the signal processing/controlling unit 53. The signal processing/controlling unit 53 performs calculation as a result of receiving the electrical signal, to generate a focus error signal, which is used for performing a focus servo control operation, by an astigma method and to generate a tracking error signal, which is used for performing a tracking servo control operation, by a push-pull method. Then, the focus actuator 40 is controlled on the basis of the focus error signal, and the tracking actuator 41 and the spindle motor 42, used for rotating the hologram recording/reproducing medium 207, are controlled on the basis of the tracking error signal and an address decoded from the groove 207c. Thereafter, a predetermined record data is written as a hologram onto a predetermined area of the hologram recording/reproducing medium 207 to generate a reproduction signal from the hologram formed at the predetermined area of the hologram recording/reproducing medium 207.

The signal processing/controlling unit 53 controls the recording/reproducing optical unit 50 in both a recording operation and a reproduction operation. More specifically, when a writing operation is performed, a two-dimensional pattern based on information (record data) is displayed at the signal-light area 118 and the reference-light area 119 of the spatial-light modulator 3 on the basis of a signal from the signal processing/controlling unit 52, in accordance with the information (record data). When a reproduction operation is performed, a two-dimensional pattern for the reference-light area 119 is written to the spatial-light modulator 3 to process the output from the array light detector 6 by the signal processing/controlling unit 53.

Other Embodiments

Figure 8:
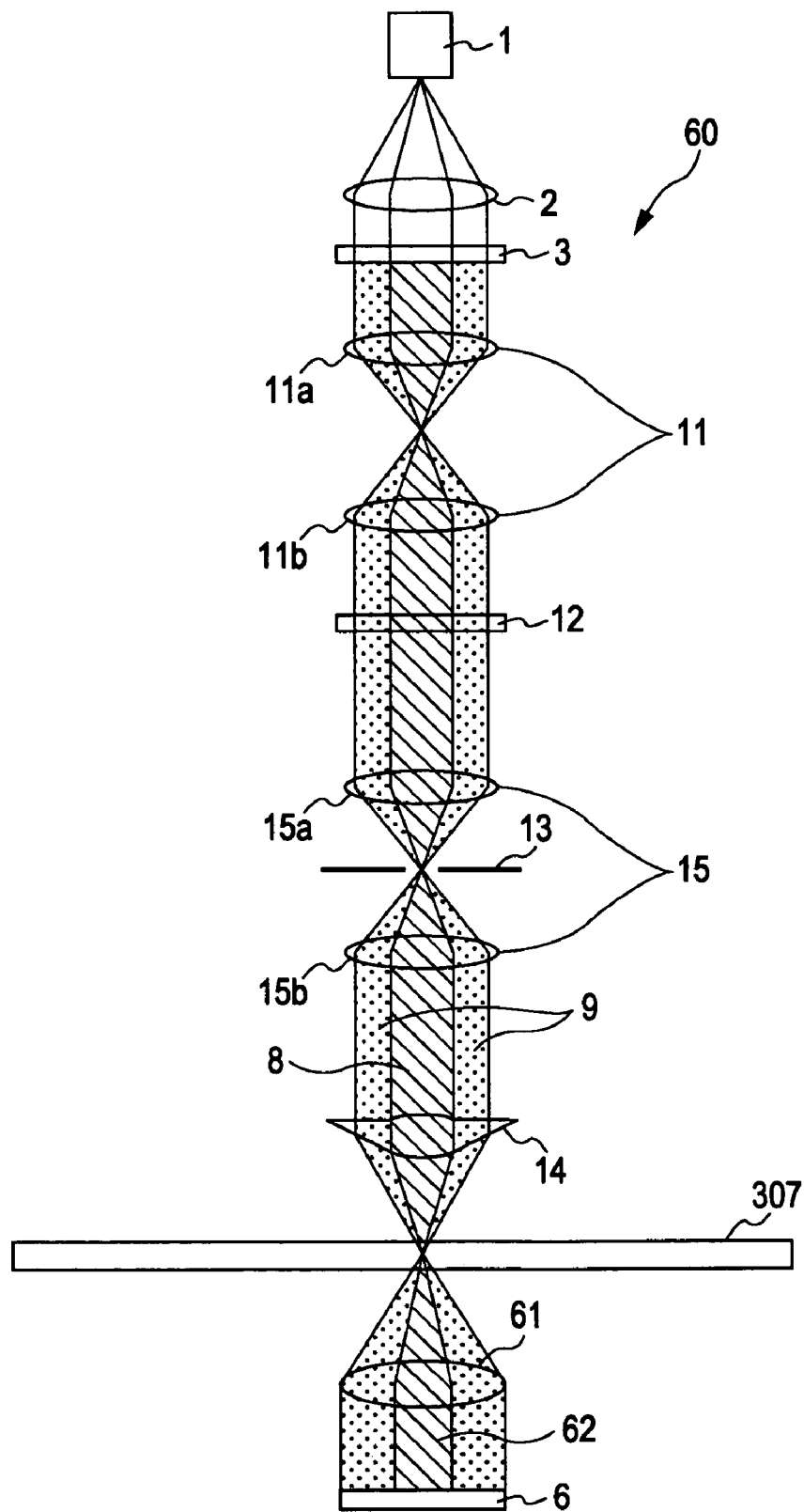
FIG. 8 shows a structure of a recording/reproducing optical unit according to another embodiment.
Figure 9:
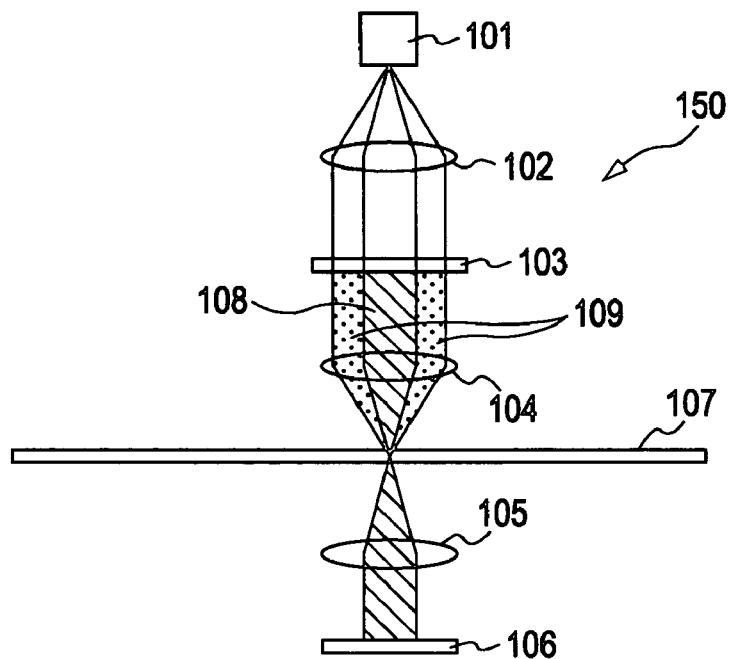
FIG. 9 shows a structure of a related recording/reproducing device.

A recording/reproducing optical unit 60, which is a main portion of a recording/reproducing device according to another embodiment, will be described with reference to FIG. 8. A servo optical unit, a servo mechanical unit, and a signal processing/controlling unit of the recording/reproducing device according to the another embodiment are almost the same as those in the previous embodiment, so that they will not be described below. Parts of the recording/reproducing optical unit 60 that are similar to and have similar functions to those of the recording/reproducing unit 50 are given the same reference numerals and will not be described below.

The recording/reproducing optical unit 60 makes it possible to use a transmissive hologram recording/reproducing medium 307, and its structure differs from that of the recording/reproducing optical unit 50 as follows. First, the recording/reproducing optical unit 60 does not have a beam splitter 10. In addition, an array light detector 6 is disposed at an opposite side of the transmissive recording/reproducing medium 307. The reason is as follows. When a reproducing operation is performed by the recording/reproducing optical unit 50, the light path of the reproduction light provided by irradiating the reflective hologram recording/reproducing medium 207 with the reference light 9 is the same as the light path of the reference light 9. In contrast, when the transmissive hologram recording/reproducing medium 307 is used, reproduction light 62 is produced at the opposite side of the hologram recording/reproducing medium 307, so that the reference light 9 and the reproduction light are not split by the beam splitter 10. Further, in the recording/reproducing optical unit 60, the reproduction light 62 is used to reproduce recorded information as a result of detecting a hologram image by the array light detector 6 through a reproducing objective lens 61.

The advantages of the recording/reproducing device using the recording/reproducing optical unit 60 are similar to those of the recording/reproducing device using the recording/reproducing optical unit 50. The difference is that it can perform a recording operation and a reproduction operation on the transmissive hologram recording/reproducing medium 307. More specifically, a synergistic action between a phase mask and a second lens portion makes it possible to spread focuses of the reference light in a wider three-dimensional area in the hologram recording/recording medium. In addition, it is possible to adjust the size of a hologram to a suitable size of the reference light 9 by also using an aperture 13. Accordingly, it is possible to perform high-quality recording/reproducing operations without wastefully using the transmissive hologram recording/reproducing medium 307.

It should be understood by those skilled in the art that various modifications, combinations, sub-combinations and alterations may occur depending on design requirements and other factors insofar as they are within the scope of the appended claims or the equivalents thereof.

The invention claimed is:

1. A hologram recording/reproducing device, comprising:
 a recording/reproducing optical unit that records information onto a hologram recording/reproducing medium and that reproduces the information from the hologram recording/reproducing medium, the recording/reproducing optical unit including:
 a laser light source that emits laser light;
 a spatial-light modulator that generates signal light and reference light from the laser light, the signal light and the reference light having a common light path;
 a phase mask disposed in the common light path, either near the spatial-light modulator or in a conjugate plane of the spatial-light modulator, wherein the phase mask has a structure which transmits the reference light and the signal light and which is such that a transmission portion of the reference light and a transmission portion of the signal light are uniformly provided; and
 an objective lens including a first lens portion and a second lens portion, the first lens portion being disposed at an inner peripheral portion of the objective lens and serving as a Fourier transformation lens that focuses the signal light to a predetermined point, and the second lens portion being disposed at an outer peripheral portion of the objective lens and serving as a lens that focuses the reference light and having focuses that are continuously or discretely disposed in an optical-axis direction of the objective lens and at portions in the hologram recording/reproducing medium along a length in the optical-axis direction of the objective lens extending through the predetermined point where the signal light is focused, wherein the second lens portion is formed as the outer peripheral portion of a conical or an Axicon lens.

2. The hologram recording/reproducing device according to claim 1, wherein the first lens portion and the second lens portion are integrated with each other into an aspherical lens.

3. The hologram recording/reproducing device according to claim 1, wherein the phase mask has a random pattern and at least two different phase depths in an incidence direction of the reference light, the random pattern being disposed at a surface of the phase mask upon which the reference light is perpendicularly incident and having a phase structure corresponding to a pixel size of the spatial-light modulator.

4. The hologram recording/reproducing device according to claim 1, further comprising a relay lens and an aperture, the relay lens being disposed in the common light path of the signal light and the reference light, the aperture being disposed in a conjugate plane of the hologram recording/reproducing medium and being used for limiting a range in which a hologram is recorded on the hologram recording/reproducing medium, the conjugate plane being formed by the relay lens.

5. A recording/reproducing optical apparatus that records information onto and reproduces the information from a hologram recording/reproducing medium, the apparatus comprising:

a laser light source that emits laser light;

a spatial-light modulator that generates signal light and reference light from the laser light, the signal light and the reference light having a common light path;

a phase mask disposed in the common light path, either near the spatial-light modulator or in a conjugate plane of the spatial-light modulator, wherein the phase mask has a structure which transmits the reference light and the signal light and which is such that a transmission portion of the reference light and a transmission portion of the signal light are uniformly provided; and an objective lens including a first lens portion and a second lens portion, the first lens portion being disposed at an inner peripheral portion of the objective lens and serving as a Fourier transformation lens that focuses the signal light to a predetermined point, and the second lens portion being disposed at an outer peripheral portion of the objective lens and serving as a lens that focuses the reference light and having focuses that are continuously or discretely disposed in an optical-axis direction of the objective lens and at portions in the hologram recording/reproducing medium along a length in the optical-axis direction of the objective lens extending through the predetermined point where the signal light is focused, wherein the second lens portion is formed as the outer peripheral portion of a conical or an Axicon lens.

* * * * *